United States Patent
Teshima et al.

(10) Patent No.: US 7,641,259 B2
(45) Date of Patent: Jan. 5, 2010

(54) RAIN SHELTER CONTROL SYSTEM AND METHOD FOR DOORWAY

(75) Inventors: Kentaro Teshima, Kariya (JP);
Kazuhiro Nakashima, Obu (JP);
Takeshi Kumazaki, Okazaki (JP);
Haruyuki Tsuzuki, Toyota (JP)

(73) Assignee: DENSO Corporation, Kariya (JP)

( * ) Notice: Subject to any disclaimer, the term of this patent is extended or adjusted under 35 U.S.C. 154(b) by 500 days.

(21) Appl. No.: 11/416,244

(22) Filed: May 3, 2006

(65) Prior Publication Data

US 2006/0260665 A1 Nov. 23, 2006

(30) Foreign Application Priority Data

May 19, 2005 (JP) ............... 2005-147187

(51) Int. Cl.
*B60J 9/00* (2006.01)
(52) U.S. Cl. ............... 296/154; 135/88.07; 160/22; 160/DIG. 4
(58) Field of Classification Search ............... 296/152, 296/154, 213, 99.1, 98, 136.01, 163; 135/88.07, 135/88.1, 88.11, 88.12, 88.14; 160/22, 66, 160/69, 37.022, DIG. 4
See application file for complete search history.

(56) References Cited

U.S. PATENT DOCUMENTS 6,782,904 B2 * 8/2004 Tien ............... 135/88.07
7,152,652 B2 * 12/2006 Heitel ............... 160/5
2001/0027846 A1 * 10/2001 Osinga ............... 160/70
2003/0146645 A1 * 8/2003 Cathala et al. ............... 296/152
2006/0060307 A1 * 3/2006 Heitel ............... 160/66

FOREIGN PATENT DOCUMENTS

| JP | 59-60020 | 4/1984 |
|---|---|---|
| JP | 4-80711 | 7/1992 |
| JP | 6-32143 | 4/1994 |
| JP | 3006707 | 11/1994 |
| JP | 11-059189 | 3/1999 |
| JP | 2001-47863 | 2/2001 |
| JP | 2003-166369 | 6/2003 |

OTHER PUBLICATIONS

Office Action issued Jul. 23, 2009 in corresponding Japanese Application No. 2005-147187 with an at least partial English-language translation thereof.

* cited by examiner

*Primary Examiner*—Lori L Lyjak
(74) *Attorney, Agent, or Firm*—Nixon & Vanderhye P.C.

(57) ABSTRACT

In a rain shelter control system for vehicular doorways, an electronic key ECU causes exterior signal transmitters to periodically transmit request signals. When a portable device receives the request signal in an arrival range of the request signals, the portable device generates a response signal responsive to the request signal. When a receiver receives the response signal from the portable device, the electronic key ECU operates to automatically open any of rain shelters near the portable device, so that a holder of the portable device and passengers fold their umbrellas under the opened rain shelters, so that they can get into a vehicle without being exposed to rain. Besides, the electronic key ECU operates to automatically open the rain shelter when they get off the vehicle.

7 Claims, 4 Drawing Sheets

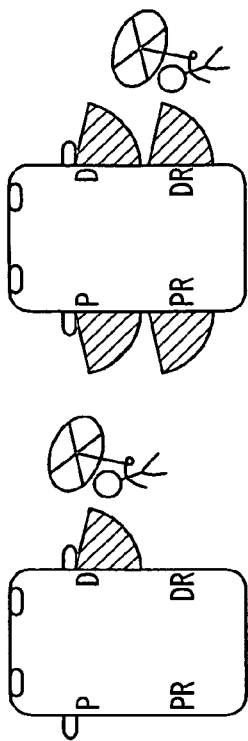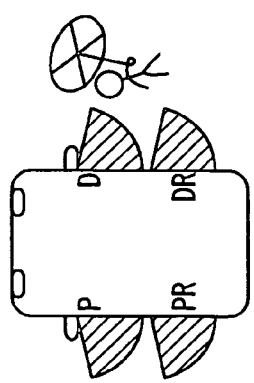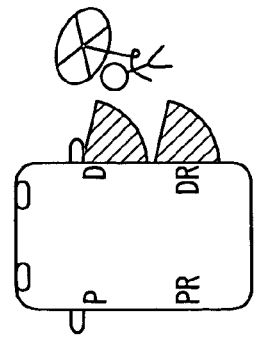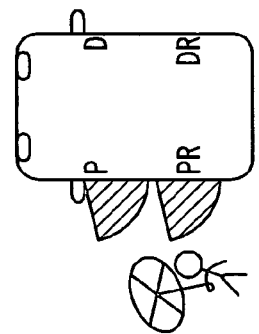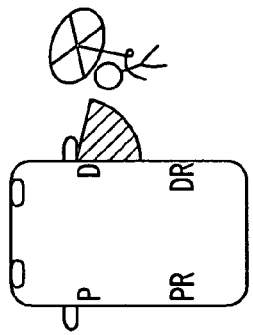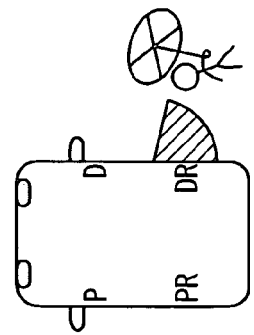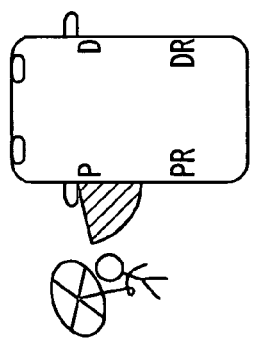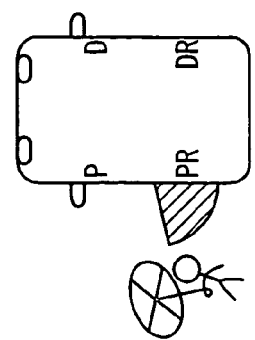

RAIN SHELTER CONTROL SYSTEM AND METHOD FOR DOORWAY

CROSS REFERENCE TO RELATED APPLICATION

This application is based on and incorporates herein by reference Japanese Patent Application No. 2005-147187 filed on May 19, 2005.

FIELD OF THE INVENTION

The present invention relates to rain shelter control system and method for a vehicular doorway for protecting a passenger from getting wet with rain in a case where he/she gets in or out of a vehicle compartment during a rainfall.

BACKGROUND OF THE INVENTION

As a procedure for getting in a vehicle during a rainfall, a passenger opens a door of a vehicle and folds an umbrella, and he/she thereafter gets in the vehicle. Accordingly, until he/she enters a vehicular compartment after folding the umbrella, he/she is exposed to rain. In order to protect from the exposure to the rain, various rain shelter control systems are proposed. For example, JP-UM-A-6-32143 discloses a rain shelter control system wherein an actuator for driving the opening and closure of the rain shelter is connected to the corresponding rain shelter disposed in the doorway. Further, a rain sensor for detecting rain, and a door switch for detecting the opening or closure of the door are disposed, so that when the door is opened in the rain detected by the rain sensor, the rain shelter is opened or expanded by the actuator. Thus, the passenger who gets in the vehicle can get in without being exposed to the rain, and he/she can save the trouble of opening and closing the rain shelter.

With the prior-art rain shelter control system, however, the rain shelter does not open before the door is opened. In getting in the vehicle, therefore, the passenger must first open the door and wait for the opening of the rain shelter, and he/she must thereafter fold his/her umbrella and get in the vehicle. That is, he/she expends a time period longer than usual in getting in the vehicle.

SUMMARY OF THE INVENTION

The present invention therefore has an object to provide a rain shelter control system and method of enhanced convenience.

According to one aspect, a rain shelter is disposed at a doorway of a vehicle to be opened and closed by a driver unit. An exterior signal transmitter periodically transmits a request signal toward outside of the vehicle, and a portable device held by a passenger of the vehicle transmits a response signal outside in response to the request signal. A receiver in the vehicle receives the response signal from the portable device. A rain shelter opening/closing control unit controls the driver unit to open the rain shelter when the receiver receives the response signal and a rain sensor detects rain.

According to another aspect, a rain shelter is disposed at a doorway of a vehicle to be opened and closed by a driver unit. An interior signal transmitter periodically transmits a request signal toward inside of the vehicle, and a portable device held by a passenger of the vehicle transmits a response signal in response to the request signal. A receiver in the vehicle receives the response signal from the portable device. A rain shelter opening/closing control unit controls the driver unit to open the rain shelter when a passenger of the vehicle gets out of the vehicle and a rain sensor detects rain.

BRIEF DESCRIPTION OF THE DRAWINGS

The above and other objects, features and advantages of the present invention will become more apparent from the following detailed description made with reference to the accompanying drawings. In the drawings:

FIGS. 2A, 2B1-2B2, 2C1-2C4 and 2D1-2D2 are schematic views showing modes concerning which of rain shelters is to be opened when an electronic key ECU is to open any of the rain shelters;

FIG. 4 is a flow chart showing a process for automatically opening any of rain shelters when a holder of a portable device is to get in a vehicle during a rainfall;

DETAILED DESCRIPTION OF THE EMBODIMENT

Figure 1:
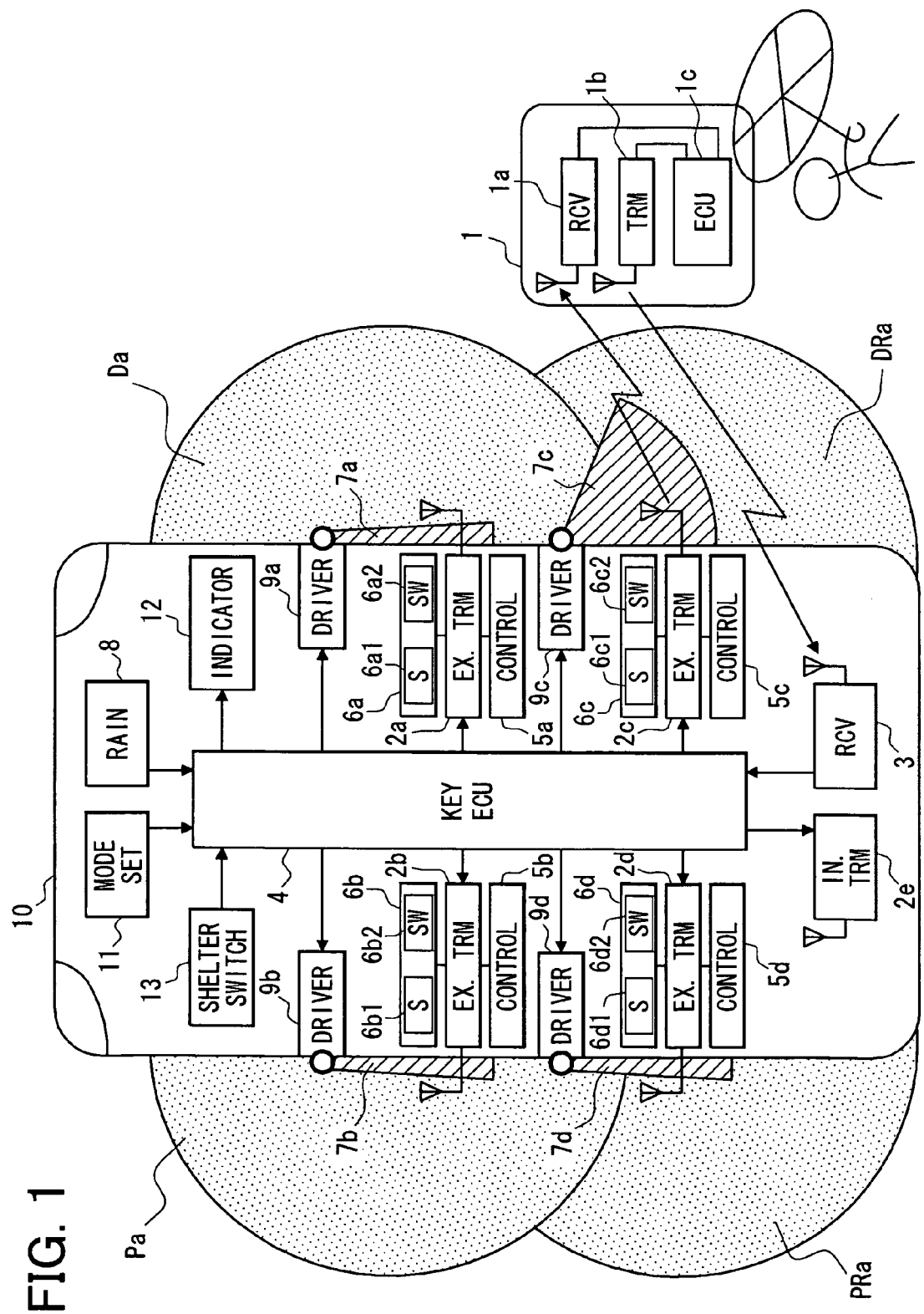
FIG. 1 is a block diagram showing a rain shelter control system for vehicular doorways according to an embodiment of the present invention.

Referring to FIG. 1, a rain shelter control system is provided in a vehicular door control system, which includes a portable device (electronic key) 1 carried by a vehicle driver or a passenger and an in-vehicle unit 10 mounted in a vehicle. An electronic key ECU 4 controls the lock/unlock state of each door on the basis of the check result of an ID code of the portable device (electronic key) 1 based on the two-way communications with the portable device 1. Further, when it is raining, the electronic key ECU 4 controls the opening and closure of each of rain shelters (canopies) 7a-7d disposed in the respective doorways.

The portable device 1 includes a radio signal receiver 1a, which receives a request signal from any of exterior signal transmitters 2a-2d and an interior signal transmitter 2e, and a radio signal transmitter 1b which transmits a response signal containing its ID code, etc., in response to the receiver of the request signal. A portable device ECU 1c is connected with the receiver 1a and the transmitter 1b, and it executes several control processes. Specifically, the portable device ECU 1c determines the existence or nonexistence of the receiver of the request signal on the basis of the receiver signal of the receiver 1a, and it generates the response signal containing its ID code, etc. and transmits the generated response signal from the transmitter 1b in response to the request signal.

The in-vehicle unit 10 includes the exterior signal transmitters 2a-2d disposed at the respective doors (not shown) of a vehicle, and the interior signal transmitter 2e disposed in the vehicular compartment. The exterior signal transmitters 2a-2d and the interior signal transmitter 2e generate respective request signals on the basis of transmission instruction signals from the electronic key ECU 4. The arrival distances of the request signals of the exterior signal transmitters 2a-2d are set at, for example, about 0.7-1.0 meters. During the parking of the vehicle, accordingly, sensing areas corresponding to the arrival distances of the request signals are respectively formed around the doors of the vehicle, and the approach of the holder of the portable device 1 to the vehicle can be sensed.

The sensing areas of the exterior transmitters 2a, 2b, 2c and 2d are defined as Da, Pa DRa and PRa, respectively, because they correspond to a driver's seat D, a front passenger's seat P, a driver's rear seat DR and a front passenger's rear seat PR. Besides, a sensing area of the interior signal transmitter 2e is set so as to cover generally only the interior or compartment of the vehicle, and whether or not the portable device 1 exists within the vehicular compartment is sensed.

Also, the in-vehicle unit 10 includes a radio signal receiver 3 which is disposed in the vehicular compartment of the vehicle, and which is brought into a state capable of receiving the response signal, in synchronism with the output of the transmission instruction signals to the exterior signal transmitters 2a-2d, so as to receive the response signal which is transmitted from the portable device 1. The response signal received by the receiver 3 is outputted to the electronic key ECU 4. Then, the electronic key ECU 4 determines whether or not the control of the lock/unlock state of the door, etc. are to be executed, on the basis of the ID code contained in the received response signal.

Further, the in-vehicle unit 10 includes door lock control units 5a-5d which are disposed at the respective doors of the vehicle to lock or unlock the corresponding doors. Each control unit set a corresponding door into an unlock standby state where, although the corresponding door is locked, it is unlockable if the holder of the portable device 1 touches a door exterior handle (door handle). The door lock control units 5a-5d operate in accordance with instruction signals from the electronic key ECU 4.

The door handles 6a-6d of the respective doors of the vehicle are provided with touch sensors 6a1-6d1, each of which can detect that the holder of the portable device 1 has manipulated a corresponding one of the door handles 6a-6d by touching the corresponding door handle. Besides, the door handles 6a-6d are respectively provided with door lock switches 6a2-6d2, each of which is configured as a push switch. When each of the door lock switches 6a2-6d2 is manipulated, the corresponding door can be locked.

Rain shelters 7a-7d, each of which is openable and closable and serves to protect a passenger from the rain, are disposed at the respective doorways of the vehicle. Each of the rain shelters 7a-7d may be configured of any member as long as it can be opened and closed. By way of example, a bellows capable of expansion (opening) and contraction (closing) or a plate of slide type may be employed as each rain shelter. Driver units 9a-9d are respectively connected to the rain shelters 7a-7d. The driver units 9a-9d open or close the respectively corresponding rain shelters 7a-7d in compliance with the instructions of the electronic key ECU 4.

Besides, a rain shelter opening/closing switch 13 with which a user gives the instruction of opening or closing any of the rain shelters 7a-7d is connected to the electronic key ECU 4, and the electronic key ECU 4 instructs any of the driver units 9a-9d to open the corresponding one of the rain shelters 7a-7d, also by the manipulation of the switch 13. The rain shelter opening/closing switch 13 is manipulated by the passenger, in getting out of the vehicle. That is, also in getting out of the vehicle, the passenger can open any of the rain shelters 7a-7d so as to avoid getting wet with rain.

A rain sensor 8 detects the rain. Depending upon whether or not it is raining, the electronic key ECU 4 determines whether each of the rain shelters 7a-7d is to be opened or to be kept closed.

In forcibly closing the opened one of the rain shelters 7a-7d after the lapse of a predetermined time period, an indicator unit 12 gives an indication or warning to that effect in compliance with the instruction of the electronic key ECU 4. In this embodiment, the warning is given in a case where, although the passenger opened any of the rain shelters 7a-7d in getting out of the vehicle, he/she does not get out within the predetermined time period.

A mode setting unit 11 is a circuit for setting a mode concerning which of the rain shelters 7a-7d is to be opened, when the electronic key ECU 4 is to open any of the rain shelters 7a-7d. Specifically, the mode can be selected from four modes shown in FIGS. 2A-2D2.

The first mode is shown in FIG. 2A. This mode is an all-seat mode, in which, when the ID code has been checked outside the vehicular compartment, all the rain shelters 7a-7d are opened irrespective of the check areas or sensing areas.

The second mode is shown in FIGS. 2B1 and 2B2. The mode shown in FIG. 2B1 is a mode (D-seat mode) in which, when the ID code has been checked in the check area corresponding to the driver's seat D of the vehicle, the rain shelter 7a corresponding to the driver's seat D is opened. When the ID code has been checked in any other check area, all the rain shelters 7a-7d corresponding to the driver's seat D, the front passenger's seat (driver's assistant's seat) P, rear passenger's seats PR and DR are opened as shown in FIG. 2B2.

Figure 4:
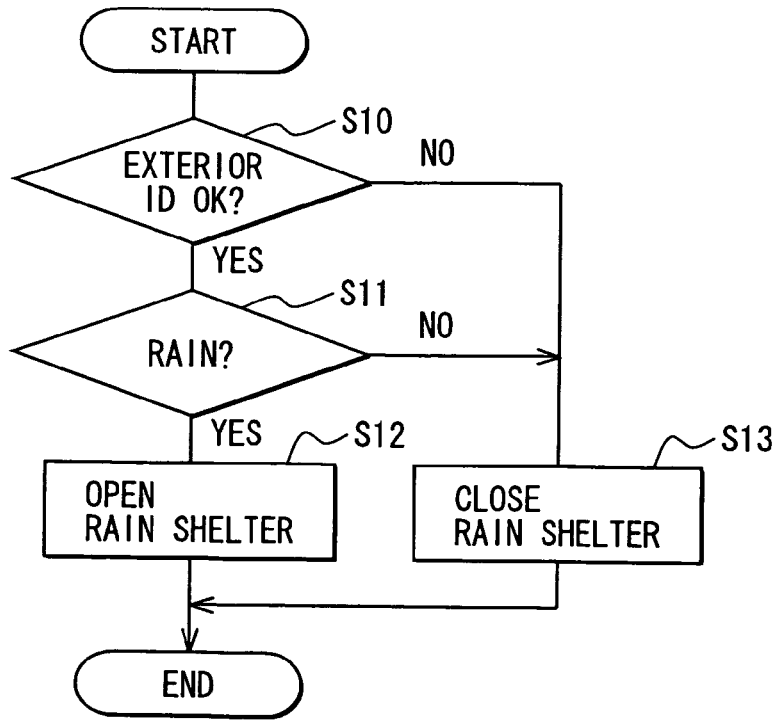

The third mode is shown in FIGS. 2C1 to 2C4. In this mode (individual-seat mode), only the rain shelter corresponding to the check area where the ID code has been checked is opened.

The fourth mode is shown in FIGS. 2D1 and 2D2. The mode shown in FIG. 2D1 is a mode when the ID code has been checked in the check areas corresponding to the assistant driver's seat side of the vehicle (the assistant driver's seat of the vehicle and its rear seat thereof), the rain shelters 7b and 7d corresponding to the assistant driver's seat side are opened. The mode shown in FIG. 2D2 is a mode (side-seat mode) in which, when the ID code has been checked in the check areas corresponding to the driver's seat side of the vehicle (the driver's seat and the rear seat thereof), the rain shelters 7a and 7c corresponding to the driver's seat and its rear side seat are opened.

The mode set by the mode setting unit 11 is stored in a memory within the electronic key ECU 4, and the electronic key ECU 4 performs control so as to open the rain shelters in accordance with the stored mode.

Figure 3:
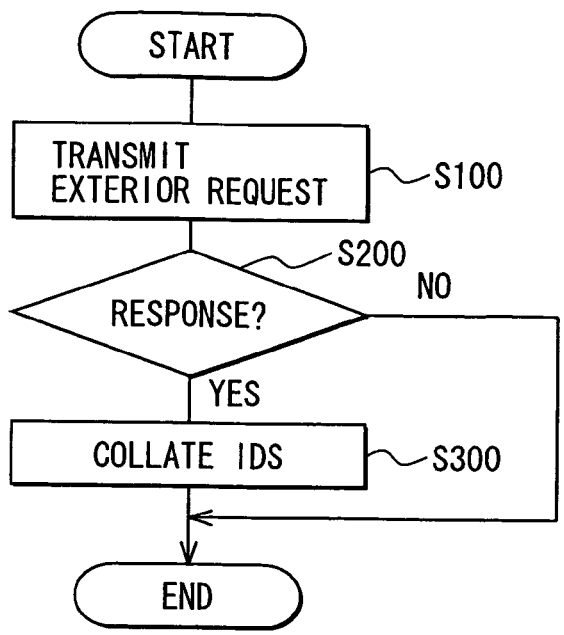
FIG. 3 is a flow chart showing a process for checking an ID code which is based on the two-way communications between an in-vehicle unit 10 and a portable device.

Next, the check process of the ID code, which is based on the two-way communications between the in-vehicle unit 10 and the portable device 1 and which serves for the electronic key ECU 4 to execute a door unlock control for unlocking each door, will be described in detail with reference to the flow chart of FIG. 3. Here, during the rainfall, the electronic key ECU 4 controls the opening and closure of the rain shelters 7a-7d on the basis of the check result. Besides, the process shown in FIG. 3 is performed every predetermined time period. More specifically, in a case where the vehicle is parked with its engine stopped and its doors locked, the electronic key ECU 4 instructs the exterior signal transmitters 2a-2d to transmit request signals each time the predetermined time period lapses, so as to verify whether or not the holder of the portable device 1 is near the vehicle.

First, at step S100, the electronic key ECU 4 outputs transmission instruction signals to the exterior signal transmitters 2a-2d so as to transmit exterior request signals from these exterior signal transmitters 2a-2d. Subsequently, at step S200, the electronic key ECU 4 determines whether or not the response signal from the portable device 1, which is responsive to the request signal, has been received. In a case where the response signal is not received, the portable device 1 is regarded as being nonexistent in any of the sensing areas, and the process shown in FIG. 3 is ended. On the other hand, in a case where the response signal has been received from the portable device 1, the process proceeds to step S300.

Here, the embodiment may be so configured that the request signals containing the identification codes peculiar to the individual exterior signal transmitters 2a-2d are transmitted from these exterior signal transmitters 2a-2d, and that the portable device 1 sends back the response signal containing the same identification code. Alternatively, the electronic key ECU 4 may well instruct the signal transmitters 2a-2d to transmit the request signals in succession. In this way, the electronic key ECU 4 can identify which of the request signals from the signal transmitters 2a-2d the response signal sent back from the portable device 1 has responded to. That is, the electronic key ECU 4 can identify which of the vehicular doors (doorways) the holder of the portable device 1 has approached.

At step S300, the electronic key ECU 4 collates the ID codes, that is, determines whether or not the ID code contained in the response signal satisfies a predetermined relationship, for example, it agrees with the pre-registered ID code (determination on the OK(YES)/NG(NO) of the check of the ID code). Besides, in case of the determination as the check OK of the ID code, the electronic key ECU 4 grasps the position of the portable device 1 having responded, from the identification code contained in the response signal or the receiver timing of the response signal.

In the case of the determination as the check OK of the ID code, the electronic key ECU 4 gives the instruction signal to the corresponding one of the door lock control units 5a-5d so that the locked door corresponding to the position of the portable device 1 may be brought into the unlock standby state. On the basis of the instruction signal, that one of the door lock control units 5a-5d which has received the instruction signal sets the corresponding door into the unlock standby state. Thereafter, the holder of the portable device 1 manipulates one of the door handles 6a-6d which corresponds to the door in the unlock standby state. When the manipulation is sensed by the corresponding one of the touch sensors 6a1-6d1, the electronic key ECU 4 gives an instruction to that one of the door lock control units 5a-5d, which corresponds to the sensed one of the door handles 6a-6d, so as to unlock the corresponding door. Thus, the holder of the portable device 1 can get into the vehicle without taking this portable device 1 in hand. The check process in the vehicular compartment is executed similarly to the above, by employing the interior signal transmitter 2e.

The manipulation for the vehicular door by the holder of the portable device 1 need not always be detected by the corresponding one of the touch sensors 6a1-6d1, but it may well be detected by employing, for example, a detection mechanism which mechanically detects that the driver or passenger has pulled the corresponding one of the door handles 6a-6d toward him/her. Alternatively, unlock buttons may well be respectively disposed on the door handles 6a-6d so as to detect the manipulation for the vehicular door in accordance with the manipulation of the corresponding one of the unlock buttons. Besides, only either the touch sensors 6a1-6d1 or the door lock switches 6a2-6d2 may well be disposed on the respective vehicular doors so as to be used as both the unlocking manipulation portions and the locking manipulation portions. Further, it is allowed to set all the vehicular doors into the unlock standby states when the collation or check of the ID code has become OK.

Besides, when it is raining in the case of the determination as the check OK of the ID code, a process for opening any of the rain shelters 7a-7d is executed in a manner shown in FIG. 4.

At step S10, the electronic key ECU 4 determines whether or not the ID code has been checked outside the vehicle. Step S10 corresponds to the processing of the above steps S100-S300. Here, in a case where the check of the ID code is NG, the holder of the portable device 1 does not exist around the vehicle, and hence, the rain shelters 7a-7d are closed or accommodated at step S13. When the rain shelters 7a-7d are already closed, any processing is not especially executed. On the other hand, in a case where the check is OK, the routine proceeds to the processing of step S11. On this occasion, the electronic key ECU 4 has recognized which of the check areas the holder of the portable device 1 exists in.

At step S11, whether or not it is raining is determined on the basis of the detection result of the rain sensor 8. Here, in a case where it is not raining, the rain shelters 7a-7d need not be opened, and hence, these rain shelters 7a-7d are closed or kept closed at step S13. On the other hand, in a case where it is raining, any of the rain shelters 7a-7d at a position corresponding to the mode (FIGS. 2A to 2D2) set by the mode setting unit 11 is opened at step S12. In a case, for example, where the mode is set in the side-seat mode and where the ID code has been checked in the check area corresponding to the driver's seat side, the rain shelters 7a and 7c corresponding to the driver's seat side are opened. Thus, the holder of the portable device 1 can fold his/her umbrella under the opened rain shelter 7a-7d and get into the vehicle without being exposed to the rain. Besides, in a case where another passenger-to-be exists, he/she can get into the vehicle without being exposed to the rain, by selecting the appropriate mode.

Even after the holder of the portable device 1 has gotten into the vehicle, the process shown in FIG. 4 is continuously executed. That is, the request signals are periodically generated out of the vehicular compartment, so as to verify whether or not the holder of the portable device 1 is outside the vehicular compartment. Besides, when the holder of the portable device 1 has gotten into the vehicle, the NG of the check is determined at step S10, and hence, the opened ones of the rain shelters 7a-7d are closed. In this manner, any opened one of the rain shelters 7a-7d is automatically closed without any operation by the holder of the portable device 1.

Figure 5:
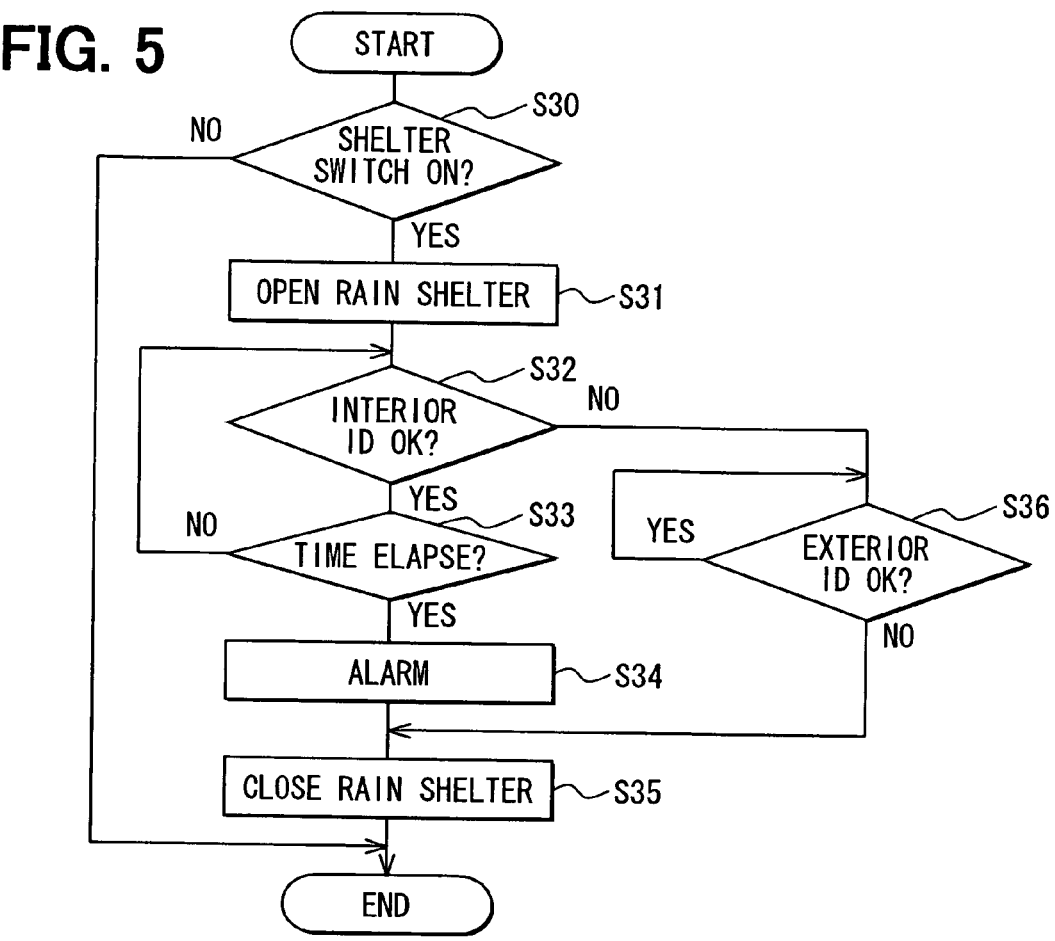
FIG. 5 is a flow chart showing a process for opening and closing any of rain shelters when a holder of a portable device is to get out of a vehicle during a rainfall.

In a case where the holder of the portable device 1 gets out of the vehicle during a rainfall, the electronic key ECU 4 performs a process for opening and closing any of the rain shelters 7a-7d as shown in FIG. 5.

Specifically, at step S30, whether or not the rain shelter opening/closing switch 13 has been manipulated or turned on is determined. When the rain shelter opening/closing switch 13 has not been manipulated, any further processing is not executed. On the other hand, when the rain shelter opening/closing switch 13 has been manipulated, that one of the rain shelters 7a-7d for which the switch 13 has been manipulated is opened at step S31.

Besides, on this occasion, at step S32, the electronic key ECU 4 instructs the interior signal transmitter 2e to periodically generate the request signals in the vehicular compartment, thereby to start processing for verifying whether or not the holder of the portable device 1 is still in the vehicular compartment. Here, when the check of the ID code is OK in the vehicular compartment, whether or not a predetermined time period has elapsed since the opening of the pertinent one of the rain shelters 7a-7d is determined at step S33. Here, whether or not the predetermined time period has lapsed may well be determined, depending upon whether or not the number of times which the response signals have been received for the check OKs has reached a predetermined number of times. Besides, when the predetermined time period has not elapsed, the routine returns to step S32 again so as to check the ID code in the vehicular compartment. On the other hand, when the predetermined time period has elapsed since the opening of the pertinent one of the rain shelters 7a-7d as the determination of step S33, an alarm to the effect of closing the opened one of the rain shelters 7a-7d is issued by the indicator unit 12 at step S34. Thereafter, at step S35, the opened one of the rain shelters 7a-7d is closed.

In this manner, the opened rain shelter is automatically closed after the elapse of the predetermined time period for the following reason. In a case where the passenger has opened any of the rain shelters 7a-7d with the initial intention of getting out of the vehicle, but where he/she changes his/her mind and stops getting out, or where a long time is expended in preparing for getting out, it inconveniences the surroundings to keep the opened rain shelter in the open state for any length of time. Moreover, since the warning to the effect of closing the rain shelter is issued in closing the rain shelter, it is possible to avoid a situation where the pertinent one of the rain shelters 7a-7d is closed just when the passenger gets out, and where he/she gets wet with the rain. Here, when the holder of the portable device 1 intends to get out again, he/she may manipulate the rain shelter opening/closing switch 13 again.

Referring back to step S32, when the check of the ID code is NG in the vehicular compartment (determination of NO), the check outside the vehicular compartment (exterior ID check) is subsequently made at step S36, so as to determine whether or not the check of the ID code is OK. Here, while the check is OK outside the vehicular compartment (determination of YES), the routine does not proceed to the next processing. More specifically, in this case, there is the possibility that the holder of the portable device 1 will still be near one of the vehicular doorways which corresponds to the opened rain shelter and that he/she will not have spread his/her umbrella yet, and hence, the opened one of the rain shelters 7a-7d is kept open. On the other hand, when the check has become NG outside the vehicular compartment (determination of NO), the holder of the portable device 1 is regarded as having left away from the vehicle, and the opened one of the rain shelters 7a-7d is automatically closed at step S35.

In the above embodiment, the opening and closing operations of the rain shelters 7a-7d disposed at the respective doorways are controlled as the accessory function of the vehicular door control system, so that the driver and passenger can smoothly get in and out of the vehicle during a rainfall. More specifically, in a case where the holder of the portable device 1 gets into the vehicle during the rainfall, any of the rain shelters 7a-7d is automatically opened in correspondence with the area where the ID code has been checked. Thus, the holder of the portable device 1 can get in the vehicle without being exposed to the rain. Besides, which of the rain shelters 7a-7d is to be opened can be selected from among the plurality of modes, so that the appropriate ones of the rain shelters 7a-7d can be opened even in a case where a plurality of passengers are to get in the vehicle. Moreover, also in a case where the holder of the portable device 1 gets out of the vehicle during a rainfall, the opening and closing operations of any of the rain shelters 7a-7d are automatically performed in accordance with a situation where he/she is inside or outside the vehicular compartment or where he/she has come away from the vehicle, so that the convenience of the rain shelter control system can be enhanced.

The above embodiment may be modified in various ways. By way of example, in the embodiment, the mode concerning which of the rain shelters 7a-7d is to be opened can be selected from among the four modes shown in FIGS. 2A-2D2, but any other mode may well be added without being restricted to the exemplary modes. Besides, the passenger himself/herself may well be permitted to set his/her favorite mode. Further, the modes shown in FIGS. 2A-2D2 and other modified modes may be selected by the portable device 1, so that the response signal of portable device 1 may include such a code indicative of the selected mode and used by the electronic key ECU 4.

In the embodiment, the method of opening any of the rain shelters 7a-7d in getting out of the vehicle is based on the manipulation of the rain shelter opening/closing switch 13, but the pertinent one of the rain shelters 7a-7d may well be opened in connection with the opening and closing of the corresponding door as in the prior art rain shelter control system disclosed in JP-UM-A-6-32143.

Figure 6:
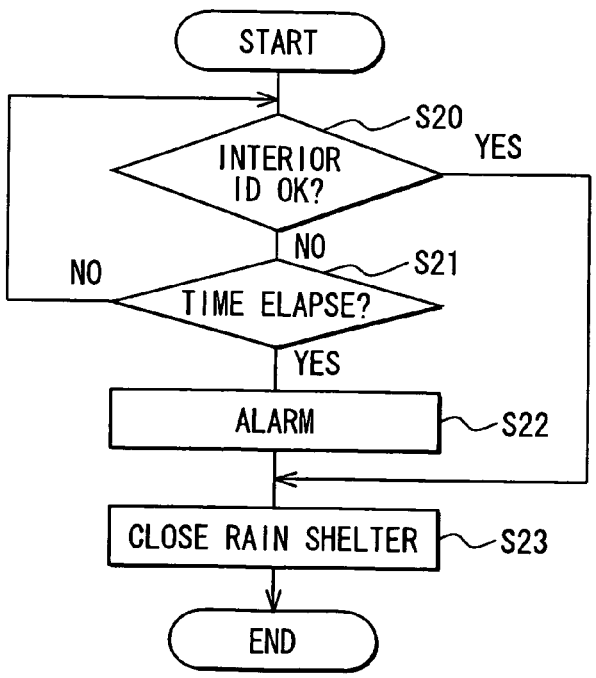
FIG. 6 is a flow chart showing a process for closing one of rain shelters which is opened when a user had gotten in according to a modified embodiment.

In the above embodiment, in getting in the vehicle, the opened one of the rain shelters 7a-7d is thereafter closed when the check of the ID code has become NG outside the vehicular compartment (NO determination at step S10 to step S13 in FIG. 4). This is because the check result of the NG outside the vehicular compartment in this case signifies that the holder of the portable device 1 has gotten into the vehicle, or that he/she has left away from the vehicle, so any of the rain shelters 7a-7d need not be kept open. Accordingly, as long as the purport is identical, the process on this occasion may well be altered. By way of example, after any of the rain shelters 7a-7d has been opened, it may well be closed as shown in FIG. 6.

Specifically, first of all, at step S20, the electronic key ECU 4 determines whether or not the check of the ID code in the vehicular compartment is OK, by employing the interior signal transmitter 2e. That is, the electronic key ECU 4 determines whether or not the holder of the portable device 1 exists in the vehicular compartment. Here, when the check of the ID code is OK in the vehicular compartment, the pertinent one of the rain shelters 7a-7d is closed at step S23. On the other hand, when the check of the ID code is NG in the vehicular compartment, the electronic key ECU 4 determines whether or not a predetermined time period has elapsed since the opening of the pertinent one of the rain shelters 7a-7d, at step S21. When the predetermined time period has not elapsed yet, the routine returns to the processing of step S20 again, so as to make the interior signal transmitter check of the ID code. More specifically, when the interior signal transmitter check has become OK within the predetermined time period since the opening of the pertinent one of the rain shelters 7a-7d, the holder of the portable device 1 is regarded as having gotten into the vehicle, and the pertinent one of the rain shelters 7a-7d is closed at that point of time.

On the other hand, when the check result of the interior signal transmitter check is NG within the predetermined time period since the opening of the pertinent one of the rain shelters 7a-7d (determination of YES at step S21), an alarm or warning to the effect of closing the opened one of the rain shelters 7a-7d is given by the indicator unit 12 at step S22. Thereafter, at step S23, the opened one of the rain shelters 7a-7d is forcibly closed. The reason why the opened rain shelter is forcibly closed in this manner is that the surroundings might be inconvenienced when the pertinent one of the rain shelters 7a-7d is kept in the open state for any length of time, or that the holder of the portable device 1 might have left away from the vehicle without getting into this vehicle. In forcibly closing the pertinent one of the rain shelters 7a-7d, the warning to that effect is given. Therefore, even if the holder of the portable device 1 exists under the opened one of the rain shelters 7a-7d with his/her umbrella folded, he/she can cope with the closure of the opened rain shelter by immediately getting into the vehicle.

As described above, the opened one of the rain shelters 7a-7d may well be closed on the basis of the check of the ID code inside the vehicular compartment, instead of the check outside the vehicular compartment. Besides, after any of the rain shelters 7a-7d has been opened, it may well be forcibly closed after the elapse of a predetermined time period irrespective of the check result of the check of the ID code in the vehicular compartment, for the following reason. By way of example, the passenger who has once gotten into the vehicle, sometimes gets out immediately as at the time when he/she has forgotten something outside the vehicular compartment. In this case, it is more preferred to keep the pertinent one of the rain shelters 7a-7d in the open state as it is, than to close the opened rain shelter when the passenger has gotten in.

What is claimed is:

1. A rain shelter control system for a vehicle having a plurality of doorways comprising:
   a rain shelter disposed at each doorway of a vehicle to be opened and closed;
   a driver unit for opening and closing the rain shelter;
   a rain sensor for detecting rain;
   an exterior signal transmitter provided for each doorway for periodically transmitting a request signal toward outside of the vehicle;
   a portable device held by a passenger of the vehicle and including a receiver unit for receiving the request signal, and a transmitter unit for transmitting a response signal outside automatically in response to the request signal;
   a receiver for receiving the response signal transmitted from the portable device; and
   a rain shelter opening/closing control unit for controlling the driver unit to open the rain shelter when the receiver receives the response signal and the rain sensor detects the rain,
   wherein the rain shelter opening/closing control unit is configured to determine the rain shelter to be opened by the drive unit based on to which exterior signal transmitter the portable device has responded.

2. The rain shelter control system as in claim 1, wherein the rain shelter opening/closing control unit controls the driver unit to automatically close the rain shelter after opening the rain shelter.

3. The rain shelter control system as in claim 2, wherein the rain shelter opening/closing control unit controls the driver unit to maintain opening of the rain shelter as long as the receiver receives the response signal from the portable device after opening of the rain shelter.

4. The rain shelter control system as in claim 2, wherein the rain shelter opening/closing control unit controls the driver unit to close the rain shelter when a predetermined time period elapses after opening of the rain shelter.

5. The rain shelter control system as in claim 2, further comprising:
   an interior signal transmitter for generating a request signal inside a vehicular compartment of the vehicle,
   wherein the rain shelter opening/closing control unit controls the driver unit to close the rain shelter when the receiver receives the response signal transmitted from the portable device in response to the request signal of the interior signal transmitter.

6. The rain shelter control system as in claim 1, wherein:
   the rain shelter opening/closing control unit includes a setting unit for setting which rain shelter is to be opened.

7. The rain shelter control system as in claim 1, wherein the rain shelter opening/closing control unit includes an indicator unit for indicating closing operation of the rain shelter.

* * * * *